(12) United States Patent
Rinker

(10) Patent No.: US 6,508,856 B1
(45) Date of Patent: Jan. 21, 2003

(54) FURNACE DISCHARGE SYSTEM AND METHOD OF OPERATION

(75) Inventor: Franklin G. Rinker, Naples, FL (US)

(73) Assignee: Maumee Research & Engineering, Inc., Northwood, OH (US)

(*) Notice: Subject to any disclaimer, the term of this patent is extended or adjusted under 35 U.S.C. 154(b) by 0 days.

(21) Appl. No.: 09/914,372
(22) PCT Filed: Feb. 26, 1999
(86) PCT No.: PCT/US99/04391
§ 371 (c)(1),
(2), (4) Date: Aug. 24, 2001
(51) Int. Cl.[7] ............................................. C21B 13/08
(52) U.S. Cl. ......................... 75/484; 266/165; 266/177
(58) Field of Search ............................ 75/484; 266/177, 266/165

(56) References Cited

U.S. PATENT DOCUMENTS

| | | |
|---|---|---|
| 4,245,821 A | 1/1981 | Kappel et al. |
| 5,180,423 A | 1/1993 | Marcuson et al. |
| 5,853,657 A | 12/1998 | Diaz et al. |
| 6,251,161 B1 * | 6/2001 | Tateishi et al. ............... 75/484 |

* cited by examiner

Primary Examiner—Melvyn Andrews
(74) Attorney, Agent, or Firm—MacMillan, Sobanski & Todd, LLC

(57) ABSTRACT

A furnace discharge system for removing material from a hearth (18) of a rotary hearth furnace (10) and method of operation. The system includes at least two material discharge augers (28, 30) positioned above the hearth (18) of the rotary hearth furnace (10). Each discharge auger (28, 30) is operatively mounted to allow for height adjustment of the discharge auger (28, 30) in alternating sequence from a material removal position to an elevated material by-pass position.

15 Claims, 3 Drawing Sheets

FURNACE DISCHARGE SYSTEM AND METHOD OF OPERATION

FIELD OF THE INVENTION

The present invention relates to a furnace discharge system and method of operation for a rotary hearth furnace. More particularly, the present invention relates to a furnace discharge system for a rotary hearth furnace including at least two helical augers that cooperatively transition material from a continuous process within the rotary hearth furnace to a non-continuous process exterior of the rotary hearth furnace.

BACKGROUND OF THE INVENTION

Briefly, a rotary hearth furnace (RHF) is a continuous reheating furnace generally having an annular inner wall circumscribed by a spaced annular outer wall. The space between the inner wall and the outer wall includes a circular rotating hearth. Burners may be installed in the inner and outer walls and in the roof. Combustion and process effluent gases are permitted to vent through a flue located in the roof or in a side wall.

Rotary hearth furnaces have been typically used for heating metallic sections for downstream mechanical forming; i.e., forging or rolling. A further application is found for heating solid material with an internal gaseous furnace atmosphere suitable for prevention of metal oxidation and/or reduction of metal oxide present in the solid material. The rotary hearth furnace is equipped with inner and outer water seals which makes it ideal for containment of the internal gases required for high temperature oxidation resistance and/or reduction.

Generally material, such as pellets, briquettes loose mixtures and agglomerates is uniformly distributed and loaded (dropped) onto the rotating hearth by a conveyor or chute for processing within the furnace. After the material is conveyed along the hearth path and processed within the furnace, the material may be in the form of pellets, briquettes, loose mixtures, agglomerates or a fused mass, and is discharged from the furnace using a single material discharge auger. The discharge auger typically consists of a central shaft with solid helical metal flights welded or bolted thereto projecting outwardly from the central shaft. The discharge auger extends across the width of the circular hearth and is connected to an external motor for rotation. The discharge auger continuously conveys the material from the hearth down a refractory chute and into a transport canister.

In applications where the material from the RHF is used downstream in a non-continuous batch process, the single auger arrangement requires an elaborate design starting with a discharge chute, discharge chute valving and/or multiple canisters and arc gate (dump valve) to control delivery of the material into a transport canister. It will be appreciated that the canisters for receiving the material from the furnace must be arranged on a turntable and indexed into and out of the load positions beneath the canister and arc gate. During this indexing, the continuous discharge of material is delivered to the canister while the filled canister is being indexed to make room for a fresh transport canister.

Alternatively, the single discharge auger can be arranged to deliver the hot product into a bifurcated chute suitable for alternatively discharging into multiple transport canisters. This arrangement requires a two-way diversion valve or arc-gate for directing the flow of material to the empty transport canister. Each leg of the of the bifurcated chute requires that a gate valve be located at the bottom terminus. It will be appreciated that considerable height is necessary to accommodate the bifurcated chute arrangement.

This single material discharge auger arrangement, in addition to equipment complexity, can contribute to operational problems and unwanted down time due to potential bridging of material in the hopper and/or failure of the dump valve (arc gate) to open or close properly. It will be appreciated that closure of the gate can be impeded by material interfering with the full swing of the gate. It will be further appreciated that the incomplete closure of the gate valve may permit extremely hot material to continuously discharge from the furnace and permit air (oxygen) to be in-drafted into the furnace thereby providing extremely hazardous conditions for auto combustion when a highly reducing atmosphere ($CO$ and $H_2$) is present in the RHF.

The present invention relates to an improved RHF discharge system that addresses the problems associated with a single material auger discharge. The present invention also facilitates the transition from the continuous process of the RHF to a non-continuous process downstream of the RHF. The dual material auger arrangement of the present invention enables the material transport canister transfer to proceed without the need for an intermediate retention hopper and material supporting arc gate. The simplicity of the discharge assembly of the present invention also simplifies the RHF process plant arrangements.

SUMMARY OF THE INVENTION

Briefly, the present invention relates to a furnace discharge system for removing material from a hearth of a rotary hearth furnace. The system includes at least two material discharge augers positioned above the hearth of the rotary hearth furnace. Each discharge auger is operatively mounted to allow for height adjustment of the discharge auger in alternating sequence from a material removal position to an elevated material by-pass position.

The material is discharged from the rotary hearth furnace by lowering at least one discharge auger to a material removal position and elevating at least one discharge auger to an elevated material by-pass position. A material transport canister is operatively attached to the discharge chute and the valve of the discharge chute of the elevated discharge auger is closed and the valve of the lowered discharge auger is opened. Material from the rotary hearth furnace is then conveyed into the material transport canister.

BRIEF DESCRIPTION OF THE DRAWING

Further features and other objects and advantages of this invention will become clear from the following detailed description made with reference to the drawings in which.

DETAILED DESCRIPTION OF THE PREFERRED EMBODIMENTS

Figure 1:
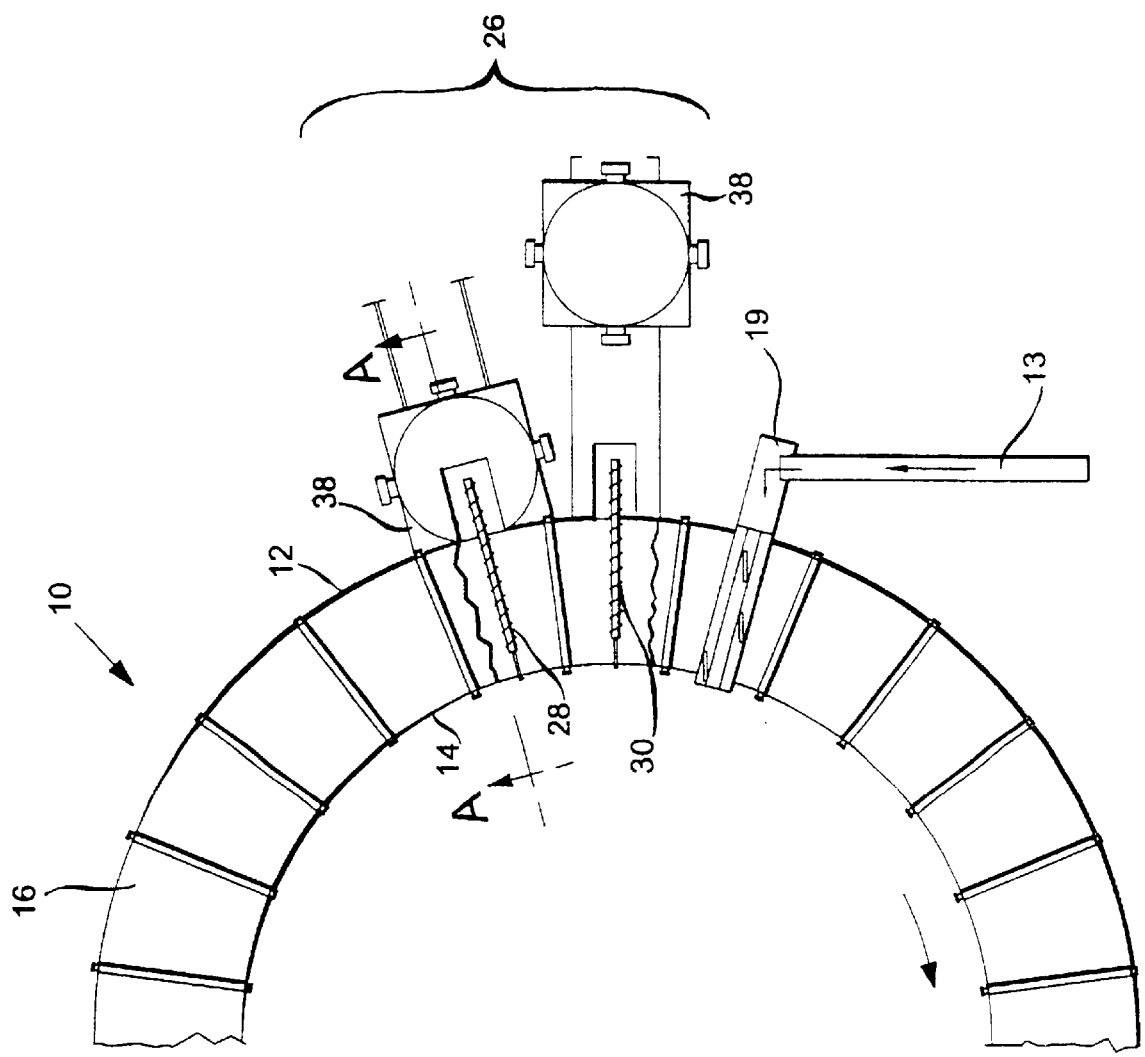
FIG. 1 is a plan view of a furnace discharge system constructed in accordance with the present invention.

In the following description, like reference characters designate like or corresponding parts. Referring to FIG. 1, a simplified sectional plan view of a rotary hearth furnace (RHF) 10 in accordance with the present invention is shown.

In considering the RHF shown in the figures, it will be appreciated that the structure is schematic only and that certain details of construction are not provided for purposes of clarity and simplicity, such details being considered well within the skill in the art once the invention is disclosed and explained.

As shown in FIG. 1, the RHF 10 includes an annular refractory insulated outer wall 12, a spaced annular refractory insulated inner wall 14 and a roof 16 interconnecting the top of the outer wall and inner wall. A circular hearth 18 rotates within the RHF 10 in the space between the outer wall 12 and the inner wall 14. A plurality of burners (not shown) are positioned about the perimeter of the RHF 10 and fire into the enclosed space between the outer wall 12, the inner wall 14, roof 16 and hearth 18. Material 20 from feed conveyor 13 is introduced onto the hearth 18 by a feeder 19 mounted in the lowered roof area 17 beneath feeder hood 15 or through the outer wall (not shown) of the RHF 10 as is well known in the art. Removable auger hoods 37 may be provided for ease of removal of the augers during maintenance periods.

The depth of material 20 on the hearth 18 may be controlled to allow maximum heating and exposure to the furnace environment. The hearth 18 is conventionally sealed to the hearth enclosure by a water seal (not shown), for example as described in U.S. Pat. No. 3,452,972, incorporated herein by reference. The hearth 18 is supported on wheeled members 24 which can be driven by any conventional driving means, for example, as shown in U.S. Pat. No. 3,452,972 or in U.S. Pat. No. 4,597,564, incorporated herein by reference.

After processing of the material 20 is complete, typically after almost one complete rotation of the hearth 18, the material 20 is removed by the furnace discharge system 26 in accordance with the present invention for subsequent treatment or use downstream of the RHF 10.

In a preferred embodiment, the furnace discharge system 26 includes at least two discharge augers 28 and 30 positioned sequentially around the circumference of the RHF 10. Each discharge auger 28 and 30 is operatively mounted on a trunnion (not shown) to allow for height adjustment of the discharge auger above the surface of the hearth 18 from a material removal position to a retracted position. In a preferred embodiment, the at least two discharge augers 28 and 30 may be operatively mounted transverse to the direction of travel of the rotating hearth 18. In an alternate embodiment, the at least two discharge augers 28 and 30 may be operatively mounted at an angle skewed from radial to serve as a combination auger and plow for easier material removal from the rotating hearth 18.

Each discharge auger 28 and 30 includes a central cylindrical shaft 32 having attached thereto at least one helical flight 34. The helical flight 34 circumscribes the central shaft 32 and projects radially outwardly from the central shaft. Each flight 34 may extend from about 1–12 inches, preferably 6 inches, radially outwardly from the shaft 32 and is about ¾–1½ inches thick. The shaft 32 may be insulated between flights 34 to reduce heat loss and may be fluid cooled as well known in the art. For a more detailed description of a discharge auger reference is made to U.S. patent application Ser. No. 08/919,399, filed Aug. 28, 1997, incorporated herein by reference.

Figure 2:
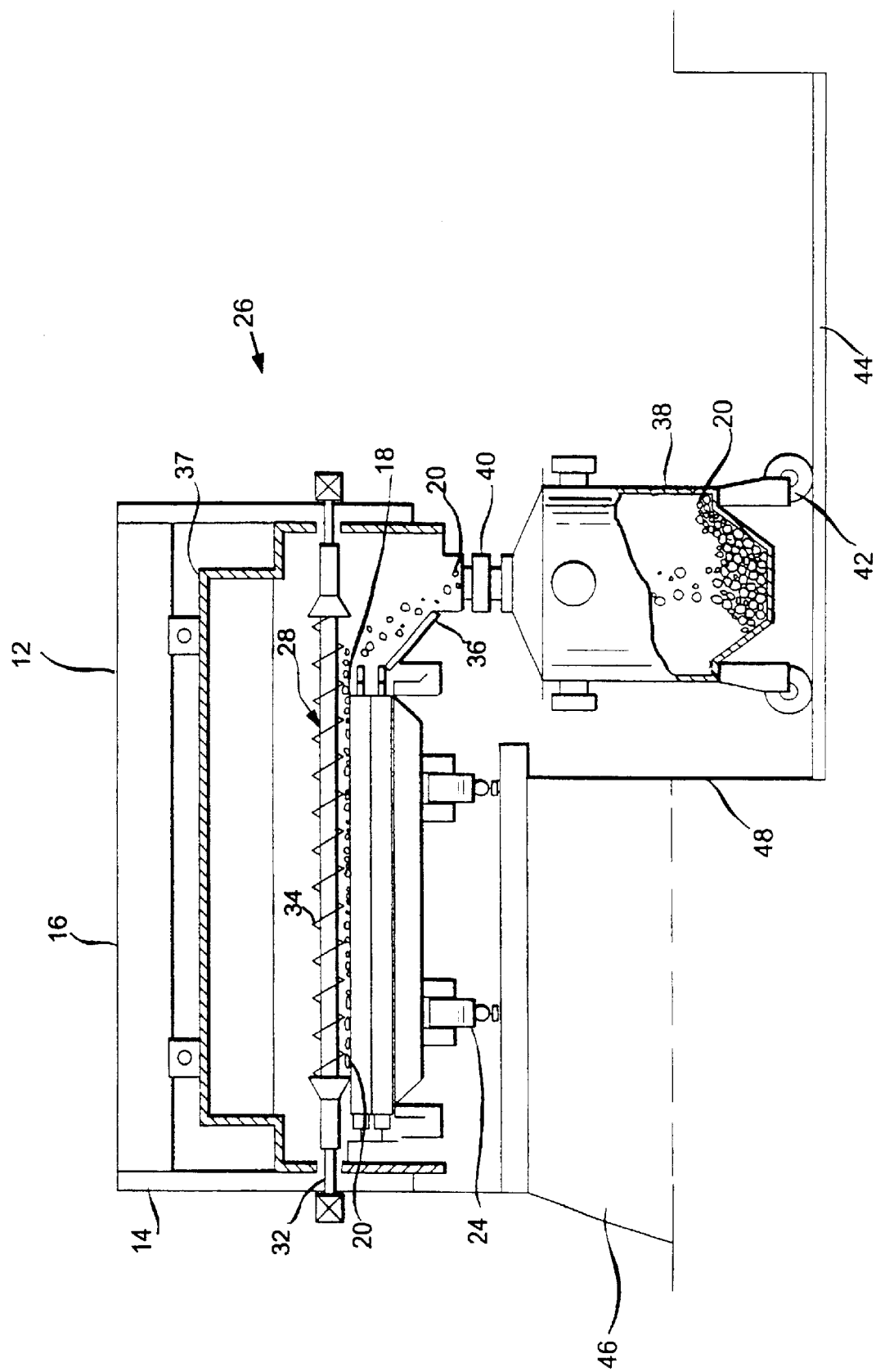
FIG. 2 is a cross-sectional view of furnace discharge system including material canister taken along line A—A of FIG. 1.
Figure 3:
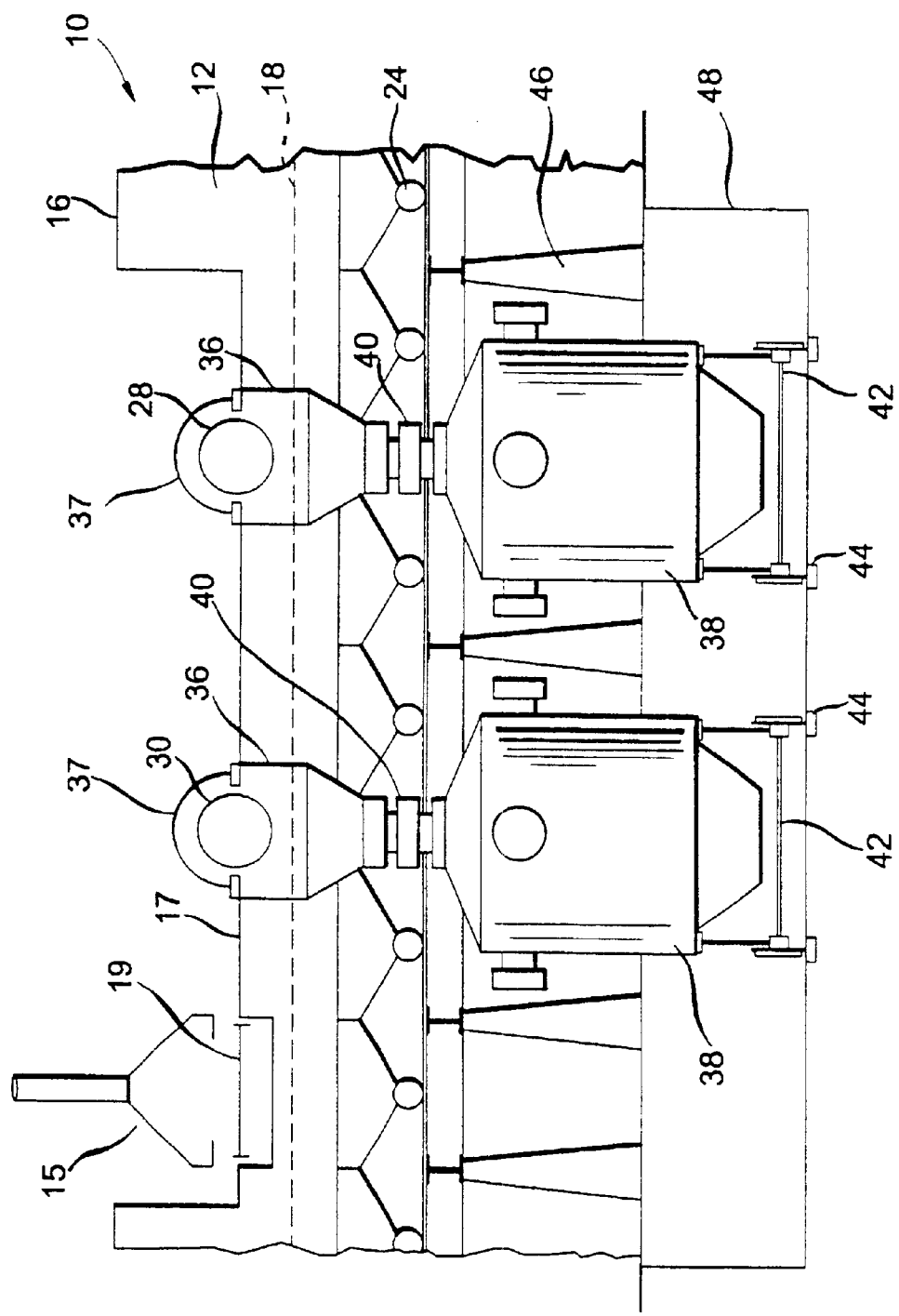
FIG. 3 is a side elevation view of an embodiment of the invention.

Referring to FIGS. 2 and 3, the first discharge auger 28 is shown in its lowered, material removal position. The material 20 is removed from the hearth 18 by the rotating helical auger and transferred to an enclosed, inert material discharge chute 36. The material 20 flows downward through the discharge chute 36 and is loaded into a movable material canister 38. The flow of material 20 and access to the furnace through chute 36 is controlled by a valve 40 such as a seal valve of a type well known in the art. It will be appreciated that valve 40 primarily functions to seal the furnace atmosphere from the external atmosphere. The valve 40 is operatively controlled to be open only when a material canister 38 is operatively attached to the discharge chute 36.

As used herein the term "inert" refers to a non-reactive atmosphere within a sealed enclosure. As shown in the figures, the transport canister 38 is an enclosed insulated inert container having a removable top adapted to receive the bottom end of the discharge chute 36. The transport canister 38 is mounted on wheels 42 for easy transport via a transfer dolly along a transfer path 44 located in loading pit 48 between the RHF 10 and downstream processing operations, e.g., iron and steel making operations. The furnace discharge assembly arrangement allows for lower head room requirements between the RHF 10 supported on piers 46 and material receiving canister 38.

Upon completion of the loading of the material transport canister 38, the discharge auger 28 is raised off of the hearth 18 and valve 40 is closed. As the material transport canister 38 approaches being filled, material discharge auger 30 is lowered onto the hearth into its material removal position to commence removing material from hearth 18 as soon as discharge auger 28 is raised from its material removal position. Prior to lowering auger 30 into its material removal position, material transport canister 38 is placed in the loading position and valve 40 is opened to allow material to be discharged from hearth 18 to transport canister 38 via chute 36. As transport canister 38 is being filled, the filled transport canister is removed from the RHF 10 area via a transfer dolly along a desired transfer path 44 to a downstream processing operation. The filled transport canister 38 is then taken off of the transfer dolly at the downstream processing operation and an empty transport canister 38 is placed on the vacant transfer dolly and moved back to the RHF 10 below the appropriate chute 36 of the discharge auger 28 or 30.

The procedure discussed above for the transport canister loading cycle and unloading cycle is repeated in an alternating manner between the first discharge auger 28 and the second discharge auger 30 as the RHF processes material 20. It will be appreciated that the present invention facilitates the continuity for the transition from a continuous process within the furnace to a non-continuous process wherein material is collected batchwise in canisters for periodic movement for batch consumption in a further downstream process. A material discharge assembly design which increases the life expectancy of the material discharge assembly discharge augers and reduces furnace downtime and maintenance requirements for periodic auger removal required by single auger discharge systems. In addition, the present furnace discharge system reduces maintenance requirements and simplifies RHF design by using a direct material discharge chute without interim material hopper storage and support dump valves Although the detailed description provided above makes reference to two discharge augers 28 and 30 it will be appreciated that the present invention may include more than two discharge augers depending upon the size and/or circumference of the RHF.

The patents and documents described herein are hereby incorporated by reference.

Having described presently preferred embodiments of the invention, the invention may be otherwise embodied within the scope of the appended claims.

What is claimed is:

1. A furnace discharge system for removing material from a hearth of a rotary hearth furnace comprising:

at least two material discharge augers positioned above the hearth of the rotary hearth furnace, each discharge auger operatively mounted to allow for height adjustment of the discharge auger in alternating sequence from a material removal position to an elevated material by-pass position.

2. The furnace discharge system of claim 1 further comprising at least two discharge chutes adapted to receive the material removed from the hearth by the discharge auger and arranged to alternately load a transport canister.

3. The furnace discharge system of claim 1 wherein the discharge augers are positioned sequentially around the circumference of the rotary hearth furnace.

4. The furnace discharge system of claim 2 wherein the material flows downward through the discharge chute and is loaded into a movable material transport canister.

5. The furnace discharge system of claim 4 wherein the flow of material and access to the rotary hearth furnace through the discharge chute is controlled by a valve.

6. The furnace discharge system of claim 5 wherein the valve is a seal valve.

7. The furnace discharge system of claim 5 wherein the valve is operatively controlled to be open only when a material transport canister is operatively attached to the discharge chute.

8. The furnace discharge system of claim 7 wherein the transport canister is an enclosed insulated container having a removable top adapted to receive the discharge chute.

9. The furnace discharge system of claim 7 wherein the transport canister is an enclosed insulated container having a removable bottom suitable for emptying the canister.

10. The furnace discharge system of claim 8 wherein the transport canister is mounted on wheels.

11. A method of discharging material from a rotary hearth furnace having at least two helical augers positioned sequentially around the circumference of the rotary hearth furnace and mounted to allow for height adjustment of the discharge augers in an alternating sequence from a material removal position to an elevated material by-pass position and at least two discharge chutes adapted to receive the material from each discharge auger, the discharge chutes having valves to seal the rotary hearth furnace, the method comprising the steps of:

lowering at least one discharge auger to a material removal position and elevating at least one discharge auger to an elevated material by-pass position;

operatively attaching a material transport canister to the discharge chute;

closing the valve of the discharge chute of the elevated discharge auger and opening the valve of the lowered discharge auger; and filling the material transport canister with material from the rotary hearth furnace.

12. The method of claim 11 wherein as the material transport canister approaches being filled, the elevated discharge auger is lowered onto the hearth into its material removal position to commence removing material from hearth as soon as discharge auger is raised from its material removal position.

13. The method of claim 12 wherein the filled transport canister is removed from the RHF area via a transfer dolly to a downstream processing operation.

14. The method of claim 13 the filled transport canister is removed from the transfer dolly at the downstream processing operation and an empty transport canister is placed on the vacant transfer dolly.

15. The method of claim 14 wherein the empty transport canister is operatively attached to the discharge chute.

* * * * *